United States Patent

Dührkoop

[11] Patent Number: 5,478,151
[45] Date of Patent: Dec. 26, 1995

[54] DEVICE FOR DETECTING EXCESSIVELY HEATED COMPONENTS OR LOCATIONS IN MOVING OBJECTS

[75] Inventor: Jens Dührkoop, Hamburg, Germany

[73] Assignee: VAE Eisenbahnsysteme Aktiengesellschaft, Vienna, Austria

[21] Appl. No.: 166,632

[22] Filed: Dec. 15, 1993

[30] Foreign Application Priority Data

Dec. 21, 1992 [AT] Austria ................................ 2531/92

[51] Int. Cl.⁶ ............................... G01J 5/00; B61L 3/00
[52] U.S. Cl. ....................... 374/124; 374/129; 246/169 A
[58] Field of Search ........................ 374/124, 129, 374/130, 121, 153; 250/330, 336.1, 338.1, 339.01, 339.02, 347, 350, 351, 353, 252.1 A, 342; 246/DIG. 1, DIG. 2, 169 A, 169 D

[56] References Cited

U.S. PATENT DOCUMENTS

| | | | |
|---|---|---|---|
| 3,211,046 | 10/1965 | Kennedy | 250/330 |
| 3,765,779 | 10/1973 | Hunt et al. | 374/129 |
| 4,574,197 | 3/1986 | Kliever | 250/347 |
| 4,682,029 | 7/1987 | Diepeveen et al. | 250/330 |
| 4,853,541 | 8/1989 | Duhrkoop | 246/169 D |
| 4,878,761 | 11/1989 | Duhrkoop | 246/169 D |
| 5,007,432 | 4/1991 | Keller et al. | 374/130 |
| 5,011,295 | 4/1991 | Krishnan et al. | 374/124 |
| 5,049,740 | 9/1991 | Pines et al. | 250/347 |
| 5,201,483 | 4/1993 | Sutnar et al. | 246/DIG. 2 |
| 5,225,883 | 7/1993 | Carter et al. | 374/124 |
| 5,235,399 | 8/1993 | Usui et al. | 374/130 |

FOREIGN PATENT DOCUMENTS 424570  5/1991  European Pat. Off. .

Primary Examiner—William A. Cuchlinski, Jr.
Assistant Examiner—Andrew Hirshfeld
Attorney, Agent, or Firm—Cushman Darby & Cushman

[57] ABSTRACT

In a device for detecting excessively heated components or locations in moving objects, in particular in moving rail vehicles, such as bearings, brakes and/or wheel rims, having at least one infrared beam detector (7) and optical devices for representing the image of the measuring point on the infrared beam detector (7), a separate lens (1, 2) is aimed toward each measuring point, which focuses the image of the measuring point on different points (4, 5) of an image-correcting system (3), and a scanning device (9), which periodically picks up the measuring beams, is disposed between the image-correcting system (3) and the detector (7) and focuses the measuring beams onto the detector (7) which is common to all measuring points.

9 Claims, 1 Drawing Sheet

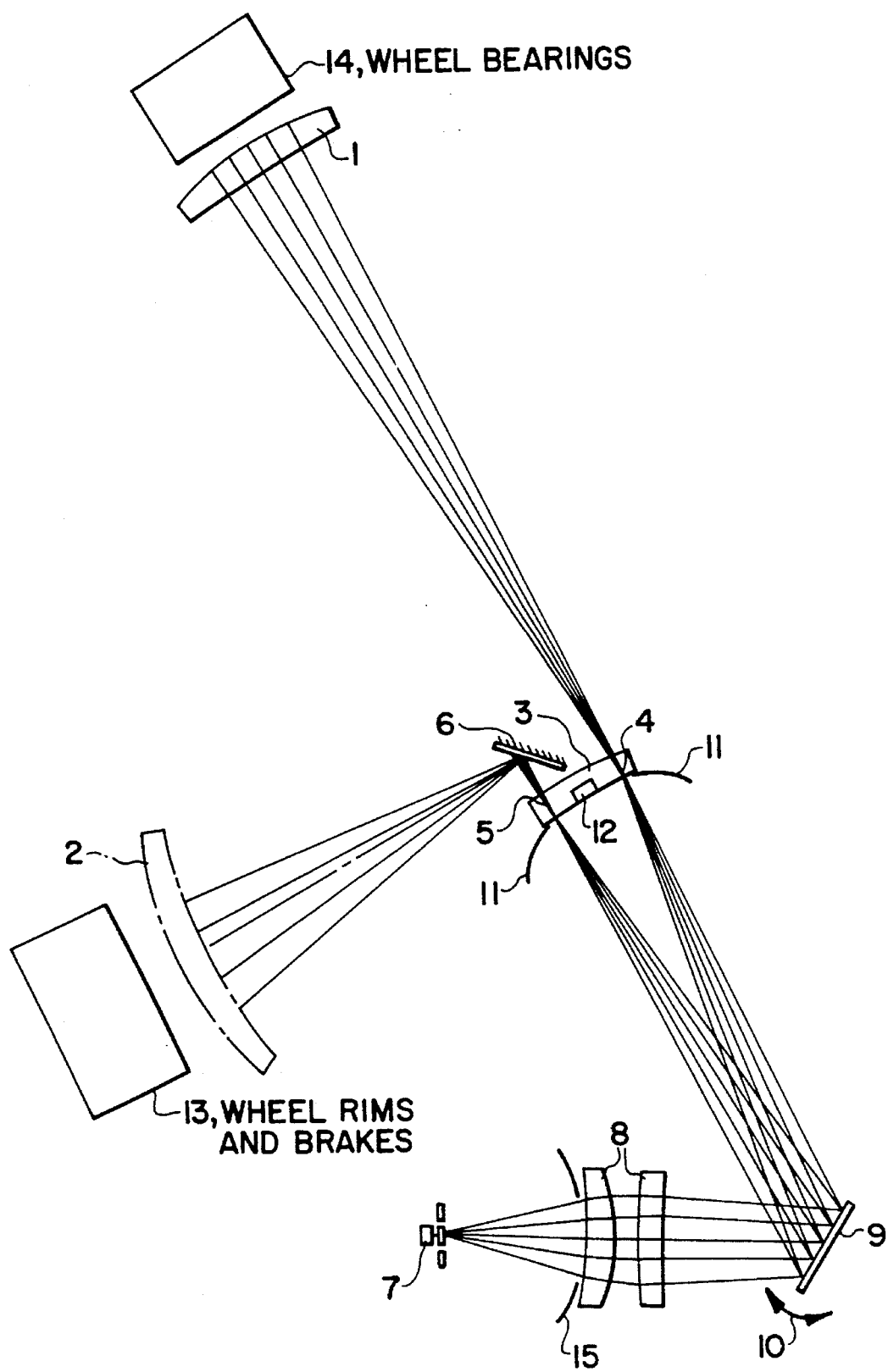

DEVICE FOR DETECTING EXCESSIVELY HEATED COMPONENTS OR LOCATIONS IN MOVING OBJECTS

FIELD OF THE INVENTION

The invention relates to a device for detecting excessively heated components or locations in moving objects, in particular in moving rail vehicles, such as bearings, brakes and/or wheel rims, having an infrared beam detector and optical devices for representing the image of the measuring point on the beam detector, wherein a separate lens is aimed toward each measuring point and a scanning device, which periodically picks up the measuring beams, is disposed between the lenses and the detector and focuses the measuring beams onto a detector which is common to all measuring points.

BACKGROUND OF THE INVENTION

Devices of the above mentioned type are used, for example, for pinpointing hot boxes. A device of the known type has been disclosed in European Patent Disclosure EP 41 178 Al, with the aid of which it is possible to detect not only hot boxes, i.e. overheated bearings, but also wheel rims or brakes of moving railroad cars. With these known devices, two separate infrared beam detectors with appropriate representation devices are disposed in a common housing. A further embodiment of this known device is limited to only one infrared beam detector, the measuring beam of which obliquely impinges on the passing wheel at the height of the wheel hub and therefore measures the temperature of the wheel rim or the brake and the bearing temperature sequentially over time. As a rule, an embodiment of this type with only one infrared beam detector is not suitable to detect hot boxes and defective brakes of a wheel by means of a common device. Finally, when differently heated components are detected together by means of only one infrared beam detector it must also be taken into consideration that too great temperature differences, together with a correspondingly rapid sequence of the measuring values, can distort the measured results from measuring points which are different in relation to each other to the point of uselessness. As a rule, threshold switches are used in evaluation circuits, which, with respectively distorted measured values, by their nature do not provide a useful correspondene between the signals and the measuring point and might generate delayed warnings.

A design is disclosed in European Patent Publication EP-A 0 424 570, wherein a plurality of lenses are directed to different positions of passing rail vehicles. To preserve the evaluation electronics, optical wave guides are disposed between the lenses and a common detector, which makes possible an increased spatial separation between the lenses and the evaluation unit.

OBJECT AND SUMMARY OF THE INVENTION

It is the object of the invention to provide a device of the previously mentioned type by means of which it is possible to assuredly detect and separately evaluate different measuring points of moving subjects with possibly greatly differing temperatures with only one infrared beam detector.

To attain this object, the device of the invention essentially consists in that the lenses focus images of the measuring points on different points of an image-correcting system, and that the scanning device which periodically picks up the measuring beams is disposed between the image-correcting system and the detector. Because the image of the measuring points is focused on different points of an image-correcting system, first a possibility for exactly separating different measuring points from each other is provided. In this case a separate lens is provided for each measuring point and the step of using separate lenses makes it possible to accurately take into account different geometric conditions and in particular measuring points which are far apart. The picture on an image-correcting device provides exactly defined areas on which the respective measuring beam is available. Because a deflecting scanning device is used, which is disposed in such a way that the measuring beams are periodically picked up on the image-correcting device, it becomes possible to direct alternatingly different measuring beams to the infrared detector in coordination with the frequency of the periodic deflection. An optical imaging lens system (infrared transformation system), which adjoins the image-correcting system and focuses the periodically picked up measuring beam on the common detector, is provided for this purpose. Because separate lenses are employed, it also becomes possible to assuredly control measuring temperatures of different intensities by appropriate dimming or brightening without overloading the infrared detector, so that as a whole no excessive temperature changes occur at the infrared beam detector which could cause a delay or deterioration of the measuring values.

To differentiate between different measuring beams, the embodiment is advantageously provided such that on the side facing the detector the image-correcting system is made reflective in at least one location. Such a reflective point of the image-correcting device can be used for the auto-collimation of the cooled infrared beam detector, so that an internal temperature comparison (reference temperature) is made possible. At the same time, such an internal temperature comparison by imaging the cooled infrared beam detector back on itself can be used as a carrier signal for the evaluation and can assist in making it possible to clearly differentiate between successive different measuring points. For this purpose the embodiment is advantageously provided such that the reflecting area of the image-correcting system facing the infrared detector is disposed between different image points of different lenses on the remaining image-correcting system.

For the internal temperature comparison or to determine a reference temperature and to prevent internal thermal interference beams, the embodiment is preferably provided such that reflecting elements, in particular concave mirrors, are disposed on the side of the image-correcting system facing the infrared detector and, if required, on the remaining image-correcting system. By means of this the prevention of interference beams on the detector is achieved. The radius of the reflecting elements, in particular the concave mirrors, is embodied such that they cause an auto-collimation, looking from the direction of the detector. An aperture limitation is simultaneously achieved with this step, which includes a considerably higher detection sensitivity. This has a positive effect on the measuring signal, particularly with low temperatures which are to be measured.

To assure that a thermal signal overload of essentially the tracking electronics of the infrared beam detector is prevented in all situations and particularly with greatly differently heated components, the embodiment is preferably provided such that at least one reduction filter, in particular a semi-reflecting mirror, is inserted in the beam path of a lens directed toward areas with high temperatures, particularly brake shoes or wheel rims.

When measuring different positions on a moving subject, such as the wheel rims and brakes, a different measuring angle from the lens is required for obtaining the optimal measured value. For this reason it is necessary that the received measuring beam can be adjusted in the measuring coordinates of the subject, so that the optical path via the image-correcting system to the detector is assured. An adjustment of this type can be realized in a simple manner in that the reduction filter is movable in relation to the measuring point and/or the lens and can be adjusted in several coordinates, such as corresponds to a preferred embodiment of the invention.

To permit an adaptation to temperatures of different intensities, in accordance with a preferred embodiment the reduction filter is embodied as a mirror which is dichroic or optically adapted to infrared and which is tuned to the energetic beam conditions. By means of the appropriate selection of the reflection in the wave range used it is possible, for example, in measuring the temperature of a wheel rim or brakes, to select this reflection at 3 to 10%, taking the angle of incidence into consideration, so that an overload of the detector is prevented by the low degree of reflection. Particularly suitable for this purpose is an uncoated sapphire disk or $CaF_2$ with blackening of the back.

In accordance with a further preferred embodiment, the design is such that the scanning device is embodied as a pivoting mirror or beam-deflecting element, in particular as a prism. Because of this, a simple scan of different measuring points is possible. When using a beam-deflecting element, for example a 90° prism, it is additionally possible to change the scanning beam direction in a scanning process.

As indicated above, because a reflecting area is provided on at least one location on the side of the image-correcting system facing the detector and because furthermore reflecting elements or concave mirrors are possibly provided, auto-collimation and thus the determination of a reference temperature becomes possible. To provide the correct separation of the reference temperature from the temperature to be measured or the individual temperatures to be measured, and to make possible a correction by means of the reference temperature even over very short times, the embodiment has preferably been provided such that HgTe:HgCd or PbSe detectors are employed. These detectors are distinguished by an extremely short rise or response time which in general lies below 5 µs, so that an assured measurement can also be performed with rapidly moving subjects.

The invention will be described in detail below by means of an embodiment, schematically illustrated in the drawing, of a device in accordance with the invention for detecting excessively heated locations on moving rail vehicles.

BRIEF DESCRIPTION OF THE DRAWINGS

The single drawing figure shows a preferred embodiment of the invention in a schematic view.

DETAILED DESCRIPTION OF THE PREFERRED EMBODIMENT

In the drawing, a first lens which is directed to a bearing, for example, is indicated by 1. A second lens 2 can be oriented toward brakes, wheel rims, or the like. The lens 1 focuses the measuring beams on an image-correcting system 3, while the measuring beams picked up by the lens 2 impinge on a focusing point 5 of the image-correcting system 3 which is different from the focusing point 4 of the first measuring beams. In order to assuredly shield the lens 1 simultaneously from possibly present scattered light, the partial area of the image-correcting system 3 in which the focusing point 5 is located must be completely darkened or shaded in relation to the lens 1, for which a deflecting mirror 6 is advantageously used by being positioned in the path between lens 1 and point 5. Such a deflecting mirror 6 can then be used, especially if it is embodied as a partially reflecting mirror, for example dichroic mirror, at the same time to limit the focused beam maximally impinging on the image-correcting system 3.

An optical imaging system, consisting of lenses 8, has been disposed between the image-correcting system 3 and the detector 7 which makes it possible for the focusing points 4 and 5 to be reproduced on the detector 7. Cyclic scanning of the two focusing points 4 and 5 on the image-correcting system 3 is made possible by a pivoting mirror 9. Its pivot movement in the direction of the two-headed arrow 10 has been selected such that the focusing points 4 and 5 are alternatingly reproduced on the infrared detector 7. The deflection is in this case limited in such a way that no scattered beam can reach the detector 7, for which purpose it is possible to provide reflecting areas 11 and a concave mirror 15 laterally at the edges of the image-correcting system 3 and the imaging system 8.

In the embodiment in accordance with the schematic drawing, a reflecting area 12 is provided on the image-correcting system 3, and in particular on the side of the image-correcting system 3 facing the detector, between the two focusing points 4 and 5. In the course of the pivoting of the pivoting mirror 9 the reflecting area 12 is also scanned and the temperature of the cooled detector 7 is reproduced in this area so that an auto-collimation is achieved. This measuring signal (reference signal) corresponding to the auto-collimation can be used in the evaluation electronics for switching the evaluation of the measured temperature values for the focusing points 4 and 5 and thus for the images of the lenses 1 and 2.

It is of course possible for the embodiment to detect a plurality of different measuring points, wherein the measuring beams picked up respectively by an individual lens are focused onto a focusing point of the image-correcting system which is located at a different point in the scanning path of the periodically deflecting scanning device.

When measuring wheel bearings, as is suggested by 14, the lens diameter is generally larger than the diameter of the beam, the deflection point of which is located exactly in the center of the lens 1. In contrast to this, a different measuring angle from the lens is required for measuring the wheel rims and brakes by means of the lens 2, such as is indicated by 13, in order to obtain an optimal measuring point on the wheel rim or the brake. For this reason it is necessary for the received measuring beam to be adjustable in its measuring height on the subject. This can be achieved in a simple manner by, for example, changing the height of the reduction filter or the beam splitter 6, so that accordingly the measuring beam takes up a different point of deflection in the lens 2. Since in the normal situation the deflection point of the beam from the wheel bearing 14 is always located in the center of the lens 1 the field of view of the detector can take other measuring points into consideration, depending on the diameter of the lens of the image-correcting system 3. Because of the disposition and embodiment of the image-correcting system 3, it is effective in the same way in both coordinates, so that the location of the beam path within the lens 2 does not make any difference.

By means of the reflective areas 11 and the concave mirror 15 it is not only prevented in this case that scattered beams reach the detector 7, but it is simultaneously possible, as already indicated above, to perform an auto-collimation, looking from the direction of the detector 7. An aperture limitation is achieved in addition to the possibility of determining a reference temperature by means of the concave mirror 15, because of which it is possible to achieve a considerably higher detection sensitivity even with low temperatures to be measured.

A beam reflecting element, for example a 90° prism, can be provided in place of the pivoting mirror 9 or in addition to it for changing the beam scanning direction.

Besides the separation of the individual temperatures of different areas to be measured, it is also possible to obtain a reference temperature for the correction of the measuring signal via the infrared-reflecting strip 12 in the image-correcting system 3 which, in place of the single lens shown, can also consist of a plurality of lenses or imaging elements attuned to each other, and via the auto-collimation made possible by the concave mirror. However, with rapidly moving subjects it is necessary in this case that the separations and evaluations or determinations of the individual temperatures are possible in the shortest possible time, for which detectors with extremely short rise or response times are required. Particularly suited for this purpose are HgTe:HgCd(CMT) or PbSe detectors, the response times of which lie below 5 µs.

What is claimed is:

1. A device for detecting the temperature of components of moving rail vehicles, comprising:

an infrared beam detector and optical devices for directing infrared beams from separate points on said components to the detector, said optical devices including:

a separate lens associated with each of said points for directing beams of infrared radiation from said points to respective separate locations on an image-correcting system; and a scanning device positioned between the image-correcting system and said detector for periodically scanning said locations and directing the respective beams onto said detector; and a reflective area located on said image-correcting system for reflecting an infrared reference beam received from said detector back to the detector.

2. A device in accordance with claim 1, wherein a reduction filter is inserted in a path between one of said lenses and the image-correcting system.

3. A device in accordance with claim 2, wherein said reduction filter is adjustable in several coordinates relative to said one lens.

4. A device in accordance with claim 2 or 3, wherein said reduction filter is a dichroic mirror.

5. A device in accordance with claim 1, wherein said reflective area is located in the image-correcting system between the locations where the infrared beams from the points of said components are directed.

6. A device in accordance with claim 1, further comprising reflecting elements disposed on opposite sides of the image-correcting system facing the detector.

7. A device in accordance with claim 1, wherein said scanning device is a pivoting mirror.

8. A device in accordance with claim 1, wherein said scanning device is a prism.

9. A device in accordance with claim 1, wherein the detector is one of a HgTe:HgCd or PbSe type.

* * * * *